(12) United States Patent
Gordon

(10) Patent No.: US 10,540,359 B2
(45) Date of Patent: Jan. 21, 2020

(54) SYSTEMS AND METHODS FOR PROVIDING A BOOST FOR CONTENT ITEMS IN RANKING FOR FEEDS

(71) Applicant: Facebook, Inc., Menlo Park, CA (US)

(72) Inventor: Taylor Gordon, New York, NY (US)

(73) Assignee: Facebook, Inc., Menlo Park, CA (US)

(*) Notice: Subject to any disclaimer, the term of this patent is extended or adjusted under 35 U.S.C. 154(b) by 187 days.

(21) Appl. No.: 15/662,026

(22) Filed: Jul. 27, 2017

(65) Prior Publication Data

US 2019/0034431 A1    Jan. 31, 2019

(51) Int. Cl.
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
CPC .......... G06F 16/24578; G06F 16/9535; G06F 16/248; G06F 16/9038; G06F 16/2455; G06F 16/90335; G06F 16/8373; G06F 16/156; G06F 16/338; G06F 16/435; G06F 16/903; G06Q 50/01; G06Q 30/0631; G06Q 30/02; G06Q 30/0241

USPC ......................................................... 707/734
See application file for complete search history.

(56) References Cited

U.S. PATENT DOCUMENTS

| 2013/0097180 A1* | 4/2013 | Tseng ..................... G06F 16/955 707/748 |
| 2014/0172877 A1* | 6/2014 | Rubinstein ............. G06Q 50/01 707/748 |
| 2015/0339405 A1* | 11/2015 | Vora .................. G06F 16/24575 707/706 |

* cited by examiner

*Primary Examiner* — Evan Aspinwall
(74) *Attorney, Agent, or Firm* — Sheppard Mullin Richter & Hampton LLP

(57) ABSTRACT

Systems, methods, and non-transitory computer readable media can determine a value of a boosting parameter, wherein the boosting parameter is indicative of a value of feedback to a first account type. Respective scores of a plurality of content items that are candidates for a feed of a user can be determined, wherein the plurality of content items are associated with at least one of the first account type or a second account type. Respective scores of content items associated with the first account type in the plurality of content items can be adjusted based on the value of the boosting parameter. The plurality of content items can be ranked based on the respective scores of the plurality of content items.

20 Claims, 7 Drawing Sheets

400 ↘

```
┌─────────────────────────────────────────────────────────────────┐
│  Determine a value of a boosting parameter, wherein the         │
│  boosting parameter is indicative of a value of feedback to a   │
│  first account type                                             │
│                            402                                  │
└─────────────────────────────────────────────────────────────────┘
```

```
┌─────────────────────────────────────────────────────────────────┐
│  Determine respective scores of a plurality of content items    │
│  that are candidates for a feed of a user, wherein the          │
│  plurality of content items are associated with at least one    │
│  of the first account type or a second account type             │
│                            404                                  │
└─────────────────────────────────────────────────────────────────┘
```

```
┌─────────────────────────────────────────────────────────────────┐
│  Adjust respective scores of content items associated with      │
│  the first account type in the plurality of content items,     │
│  based on the value of the boosting parameter                  │
│                            406                                  │
└─────────────────────────────────────────────────────────────────┘
```

```
┌─────────────────────────────────────────────────────────────────┐
│  Rank the plurality of content items based on the respective   │
│  scores of the plurality of content items                      │
│                            408                                  │
└─────────────────────────────────────────────────────────────────┘
```

SYSTEMS AND METHODS FOR PROVIDING A BOOST FOR CONTENT ITEMS IN RANKING FOR FEEDS

FIELD OF THE INVENTION

The present technology relates to the field of social networks. More particularly, the present technology relates to techniques for ranking content items associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide user profiles for various users through which users may add connections, such as friends, or publish content items. A content item can be presented on a profile page of a user. A content item can also be presented through a feed, such as a newsfeed, for a user to view and access.

SUMMARY

Various embodiments of the present disclosure can include systems, methods, and non-transitory computer readable media configured to determine a value of a boosting parameter, wherein the boosting parameter is indicative of a value of feedback to a first account type. Respective scores of a plurality of content items that are candidates for a feed of a user can be determined, wherein the plurality of content items are associated with at least one of the first account type or a second account type. Respective scores of content items associated with the first account type in the plurality of content items can be adjusted based on the value of the boosting parameter. The plurality of content items can be ranked based on the respective scores of the plurality of content items.

In some embodiments, the first account type is associated with a number of connections that is below a threshold value.

In certain embodiments, the feedback is a like for a content item.

In an embodiment, the determining the value of the boosting parameter comprises: executing a plurality of policies each assigning different values to the boosting parameter; measuring a distribution of feedback to the first account type and the second account type based on the executing the plurality of policies; and determining the value of the boosting parameter based on the measured distribution of feedback.

In some embodiments, the boosting parameter is associated with a control variable of a proportional-integral-derivative (PID) controller, and the measuring the distribution of feedback comprises measuring a process variable of the PID controller.

In certain embodiments, the determining the value of the boosting parameter based on the measured distribution of feedback comprises minimizing an error between a measured value of the process variable and a setpoint indicative of a desired value of the process variable.

In an embodiment, the process variable is a number of likes for content items associated with the first account type.

In some embodiments, at least some of the ranked plurality of content items can be provided in the feed of the user.

In certain embodiments, the first account type is divided into one or more groups, and the boosting parameter is determined for each of the one or more groups.

In an embodiment, the adjusted respective scores of the content items associated with the first account type increase a distribution of feedback for content items associated with the first account type.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4 illustrates an example first method for providing a boost for small accounts in ranking content items for feeds, according to an embodiment of the present disclosure.

Figure 1:
FIG. 1 illustrates an example system including an example small account boosting feed ranking module configured to provide a boost for small accounts in ranking content items for feeds, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing a Boost for Content Items in Ranking for Feeds

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide user profiles for various users through which users may add connections, such as friends, or publish content items. A content item can be presented on a profile page of a user. A content item can also be presented through a feed, such as a newsfeed, for a user to view and access.

Conventional approaches specifically arising in the realm of computer technology can rank content items for inclusion in a user's feed. For example, each content item that is a candidate for including in a user's feed can be assigned a score, and the candidate content items can be ranked according to their respective scores. At least some of the ranked content items can be presented in the user's feed. Users can provide feedback relating to content items presented in their feeds, for example, by commenting, liking, sharing, etc. Some content items may be associated with top accounts, which may have a significant number of connections or followers. For example, top accounts can be associated with celebrities or other public figures. Other content items may be associated with small accounts, which may include all accounts other than top accounts. Conventional approaches may generally rank content items associated with top accounts ("top account content items") more highly than content items associated with small accounts ("small account content items"), for example, due to a higher likelihood of users providing feedback for or otherwise interacting with content items associated with top accounts. However, a lower level of exposure of small account content items in users' feeds can result in a lower level of feedback for small account content items, which in turn can affect downstream content production of users associated with small accounts. For example, small account content items are less likely to be included in users' feeds and therefore less likely to receive likes, and a lower number of likes for small account content items can influence small account users to not create as much content.

An improved approach rooted in computer technology can overcome the foregoing and other disadvantages associated with conventional approaches specifically arising in the realm of computer technology. Based on computer technology, the disclosed technology can provide a boost for content items associated with small accounts in ranking content items for feeds. Content items can be ranked based on various factors, such as a probability of users providing feedback for or otherwise performing an interaction with a content item. Examples of feedback or interaction can include any type of information users provide or actions users take with respect to a content item, such as liking, commenting, sharing, etc. As an example, content items can be ranked based on a probability of users liking a content item. Scores for small account content items can be adjusted by (e.g., increased by or based on) a boosting parameter in order to distribute feedback more evenly across small account content items and top account content items. Alternatively, it can be considered that scores for top account content items are adjusted by (e.g., decreased by or based on) a penalty. A value of the boosting parameter can be determined such that an optimal distribution of feedback to small account content items and top account content items can be achieved. The boosting parameter can be based on a control variable of a proportional-integral-derivative (PID) controller. Policies assigning different values to the boosting parameter can be executed in order to determine which value of the boosting parameter is most effective in achieving an optimal distribution of feedback. Achieving an optimal distribution of feedback can lead to an optimal level of content production by users associated with accounts. In this manner, applying a boosting parameter to small account content items in ranking content items can increase overall content production by users associated with accounts. Details relating to the disclosed technology are explained below.

FIG. 1 illustrates an example system 100 including an example small account boosting feed ranking module 102 configured to provide a boost for small accounts in ranking content items for feeds, according to an embodiment of the present disclosure. The small account boosting feed ranking module 102 can include a boosting parameter determination module 104 and a feed ranking module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the small account boosting feed ranking module 102 can be implemented in any suitable combinations. For illustrative purposes, the disclosed technology is described in connection with a social networking system, but the disclosed technology can apply to any type of system.

The boosting parameter determination module 104 can determine a boosting parameter for ranking content items for feeds. The boosting parameter determination module 104 can define one or more policies that assign different values to the boosting parameter and execute the policies in order determine which value of the boosting parameter is effective in achieving a desired distribution of feedback across accounts. As used herein, feedback can include, any type of information users provide or actions users take with respect to a content item, such as liking, commenting, sharing, etc. Functionality of the boosting parameter determination module 104 is described in more detail herein.

The feed ranking module 106 can rank content items for users' feeds. For example, a score can be determined for each content item that is a candidate for inclusion in a user's feed, and content items can be ranked based on corresponding scores. In some embodiments, a score associated with a content item can be based on a probability of the user liking the content item. In other embodiments, a score associated with a content item can be based on other factors in addition to or instead of a probability of a user liking a content item. For example, a score associated with a content item can be based additionally or alternatively based on at least one of a probability of a user commenting on a content item, a probability of a user sharing a content item, or a probability of a user otherwise interacting with the content item. Content items that are candidates for inclusion in a user's feed can include content items that are created by small accounts as well as content items that are created by top accounts. A boost can be provided for small account content items by applying a boosting parameter to scores of small account content items. As just one example in which feedback and interactions relate to a user liking a content item, a ranking algorithm can be described as follows:

If small account, score=P(like)*boosting parameter, and
If not small account, score=P(like), where score is a value on which a content item can be ranked, P(like) is a probability of a user liking the content item, and boosting parameter is a value to increase score. In certain embodiments, a boost to small account content items can be considered as a penalty to top account content items, and a ranking algorithm can be described as follows:

If small account, score=P(like); and

If not small account, score=P(like)*penalty, where score is a value on which a content item can be ranked, P(like) is a probability of a user liking the content item, and penalty is a value to decrease score. In the above ranking algorithms, a score for a content item is multiplied by a boosting parameter or a penalty, but the score for the content item can be adjusted based on the boosting parameter or the penalty in any appropriate manner (e.g., adding, subtracting, increasing by a percentage, decreasing by a percentage, etc.). In some embodiments, an account can have a number of connections, and the account can be assigned to a group or bucket based on the number of connections. For example, a first group or bucket can include accounts in which each account has a number of connections in a first predetermined range (e.g., top one percentile to tenth percentile), a second group or bucket can include accounts in which each account has a number of connections in a second predetermined range (e.g., eleventh percentile to twentieth percentile), etc. In such cases, each group or bucket can have a separate respective boosting parameter for content items of accounts in the group or bucket. In this regard, the separate boosting parameters associated with various groups or buckets can have different values. In certain embodiments, there can be one boosting parameter for multiple groups or buckets, but values of the boosting parameter can differ for each group or bucket. In some embodiments, the boosting parameter can be applied in real time. For example, the boosting parameter can be applied in real time to a small account content item if a threshold value is not satisfied, and applying the boosting parameter can stop once the threshold value is satisfied. In one example, the threshold value can indicate a minimum level of feedback, such as a number of likes, for a small account. All examples herein are provided for illustrative purposes, and there can be many variations and other possibilities.

In some embodiments, the small account boosting feed ranking module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the small account boosting feed ranking module 102 can be, in part or in whole, implemented as software running on one or more computing devices or systems, such as on a server system or a client computing device. In some instances, the small account boosting feed ranking module 102 can be, in part or in whole, implemented within or configured to operate in conjunction or be integrated with a social networking system (or service), such as a social networking system 630 of FIG. 6. Likewise, in some instances, the small account boosting feed ranking module 102 can be, in part or in whole, implemented within or configured to operate in conjunction or be integrated with a client computing device, such as the user device 610 of FIG. 6. For example, the small account boosting feed ranking module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the small account boosting feed ranking module 102. The data maintained by the data store 120 can include, for example, information relating to small accounts, top accounts, content items, feeds, boosting parameters, policies, feedback, distribution of feedback, statistics, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the small account boosting feed ranking module 102 can be configured to communicate and/or operate with the data store 120. In some embodiments, the data store 120 can be a data store within a client computing device. In some embodiments, the data store 120 can be a data store of a server system in communication with the client computing device.

Figure 2:
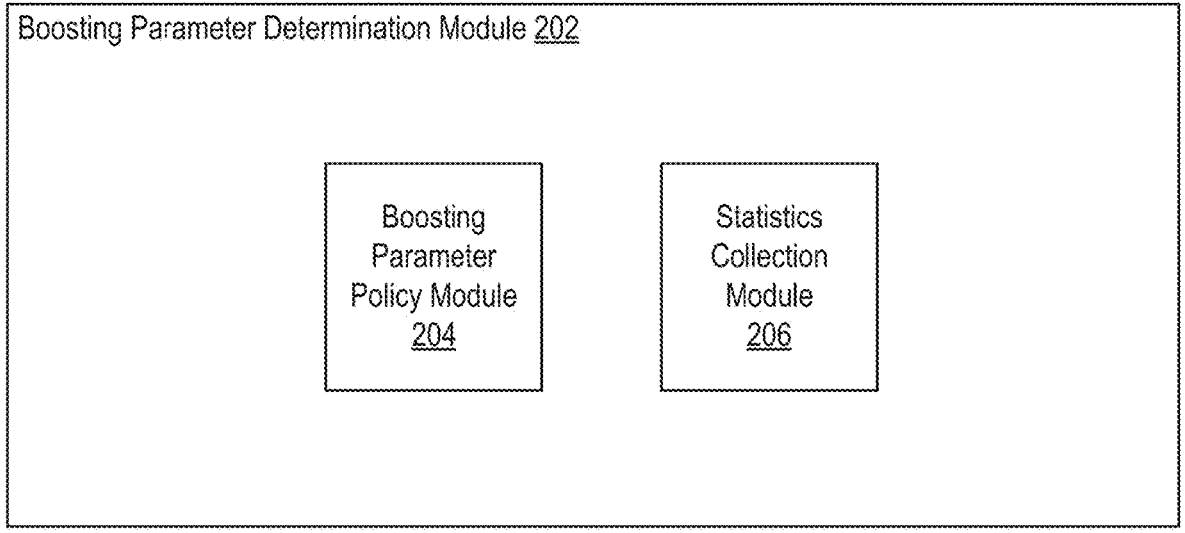
FIG. 2 illustrates an example boosting parameter determination module configured to determine a boosting parameter for ranking content items for feeds, according to an embodiment of the present disclosure.

FIG. 2 illustrates an example boosting parameter determination module 202 configured to determine a boosting parameter for ranking content items for feeds, according to an embodiment of the present disclosure. In some embodiments, the boosting parameter determination module 104 of FIG. 1 can be implemented with the example boosting parameter determination module 202. As shown in the example of FIG. 2, the example boosting parameter determination module 202 can include a boosting parameter policy module 204 and a statistics collection module 206.

A value model can be defined to incorporate a value of feedback in ranking content items. Small accounts and top accounts can value feedback differently. For example, an additional like to a small account can have a much higher value than an additional like to a top account. The value model can be defined to include one or more parameters that can be based on the value of feedback to different types of accounts. As an example, the value model can include a boosting parameter that can be applied to scores for small account content items. In an embodiment, the boosting parameter can indicate a weight assigned to a like to a small account. Parameters in the value model can be based on proportional-integral-derivative (PID) controllers. A PID controller can continuously calculate an error value as a difference between a desired setpoint and a measured process variable and apply a correction based on proportional, integral, and derivative terms (i.e., denoted P, I, and D, respectively). The PID controller can attempt to minimize the error value over time by adjustment of a control variable. Parameters in the value model can be considered to be control variables, which can influence corresponding process variables. A process variable can be measured, and a control variable associated with the process variable can be updated based on a measured value of the process variable. For example, the boosting parameter can be a control variable, and a corresponding process variable for the boosting parameter can be a variable that can be measured, such as a number of likes to small accounts, a ratio of likes to small accounts, etc. Many variations are possible.

The PID controller can adjust control variables until process variables converge to desired values. A desired or ideal value of a process variable can be referred to as a setpoint. A desired or ideal value can be determined or selected as appropriate. For example, a desired or ideal value can be determined based on data, analysis, research, estimation, etc. By way of analogy to a temperature system, the temperature of a room can be influenced by varying how much heat is output. An ideal temperature can be a setpoint, a current temperature can be a process variable, and an amount of heat output can be a control variable. Similarly, for ranking content items, an ideal distribution of feedback can be a setpoint, a current distribution of feedback can be a process variable, and the boosting parameter can be a control variable. An ideal distribution of feedback may be determined as appropriate. For example, the ideal distribution of feedback can be a distribution that leads to an increase in overall content production. Parameters in the value model can be defined as control variables of a PID controller as appropriate, along with corresponding process variables which can be measured and setpoints associated with corresponding process variables. Once variables have been defined, the PID controller can update the control variable in terms of how much error there is between the setpoint and the process variable. The control variable u(t) (e.g., boosting parameter) can be updated at time t by setting a value of the u(t) according to the following equation:

$$u(t) = a*e(t) + b*E(t) + c*d(t) \qquad (1),$$

where e(t) represents an amount of error between the process variable (e.g., the current distribution of feedback) and the setpoint (e.g., ideal distribution of feedback); E(t) represents a total cumulative error (e.g., the sum of all e(t) values measured up to time t); and d(t) represents the derivative of e(t) with respect to time. Parameters a, b, and c can be tuned or changed and can influence a convergence pattern (e.g., convergence speed and smoothness). Process variables can be measured, and control variables can be updated based on the measured values for the process variables.

The boosting parameter policy module 204 can define one or more policies assigning different values to the boosting parameter. For example, different values of the boosting parameter can be assigned for policies based on equation (1) above. For one or more initial policies, the value of the boosting parameter can be set to a selected value, for example, without referring to equation (1). Different policies can be tested in order to determine which values of the boosting parameter are effective. In some embodiments, multiple policies can be executed in parallel. Data can be obtained from executing the policies. For example, the value of the process variable can be measured. The process variable can relate to distribution of feedback, and distribution of feedback can be expressed or represented in different ways as appropriate. In one example, the process variable can represent an amount of feedback for small account content items, such as a number of likes. In another example, the process variable can represent a ratio or percentage of feedback for small account content items to a total amount of feedback for content items associated with all accounts. In yet another example, the process variable can represent a ratio or percentage of feedback for small account content items to an amount of feedback for top account content items. Many variations are possible. The control variable (e.g., the boosting parameter) can be updated based on the measured value(s) of the process variable. For example, the control variable can be updated according to how much the corresponding process variable deviates from the ideal value based on equation (1). Data from executing the policies and the value of the process variable can be obtained by the statistics collection module 206 described below.

The statistics collection module 206 can obtain relevant data associated with execution of one or more policies. For example, the statistics collection module 206 can measure the value of the process variable (e.g., a number of likes) of the PID controller. In some embodiments, an account can have a number of connections, and accounts can be divided into different groups based on respective number of connections, and the value of the process variable can be measured for each group. As an example, a first group of accounts can include accounts in which each account has a number of connections in a first predetermined range (e.g., top one percentile to twenty-fifth percentile), a second group of accounts can include accounts in which each account has a number of connections in a second predetermined range (e.g., top twenty-sixth percentile to fiftieth percentile), etc. In some embodiments, multiple boosting parameters may be used for different groups of small accounts. For example, a first group of small accounts can have an associated first boosting parameter, a second group of small accounts can have an associated second boosting parameter, etc.

The statistics collection module 206 can measure process variables. In some embodiments, a batch of content items for a user's feed can be ranked, and identifiers associated with content items can be stored in an in-memory cache. After a period of time, such as a fixed-time interval (e.g., a selected number of second(s), minute(s), hour(s), etc.), data associated with a process variable can be obtained. For example, actions taken by users in connection with the content items can be obtained. Examples of actions can include providing feedback, such as likes, comments, shares, etc. Actions may be logged by a client and stored to a database that can be queried from the statistics collection module 206. The statistics collection module 206 can store or cause to store information about actions and other relevant information, and the boosting parameter policy module 204 can update the value of the process variable based on the actions. The boosting parameter policy module 204 can also update the cumulative error and the derivative in equation (1) based on the actions.

Figure 3:
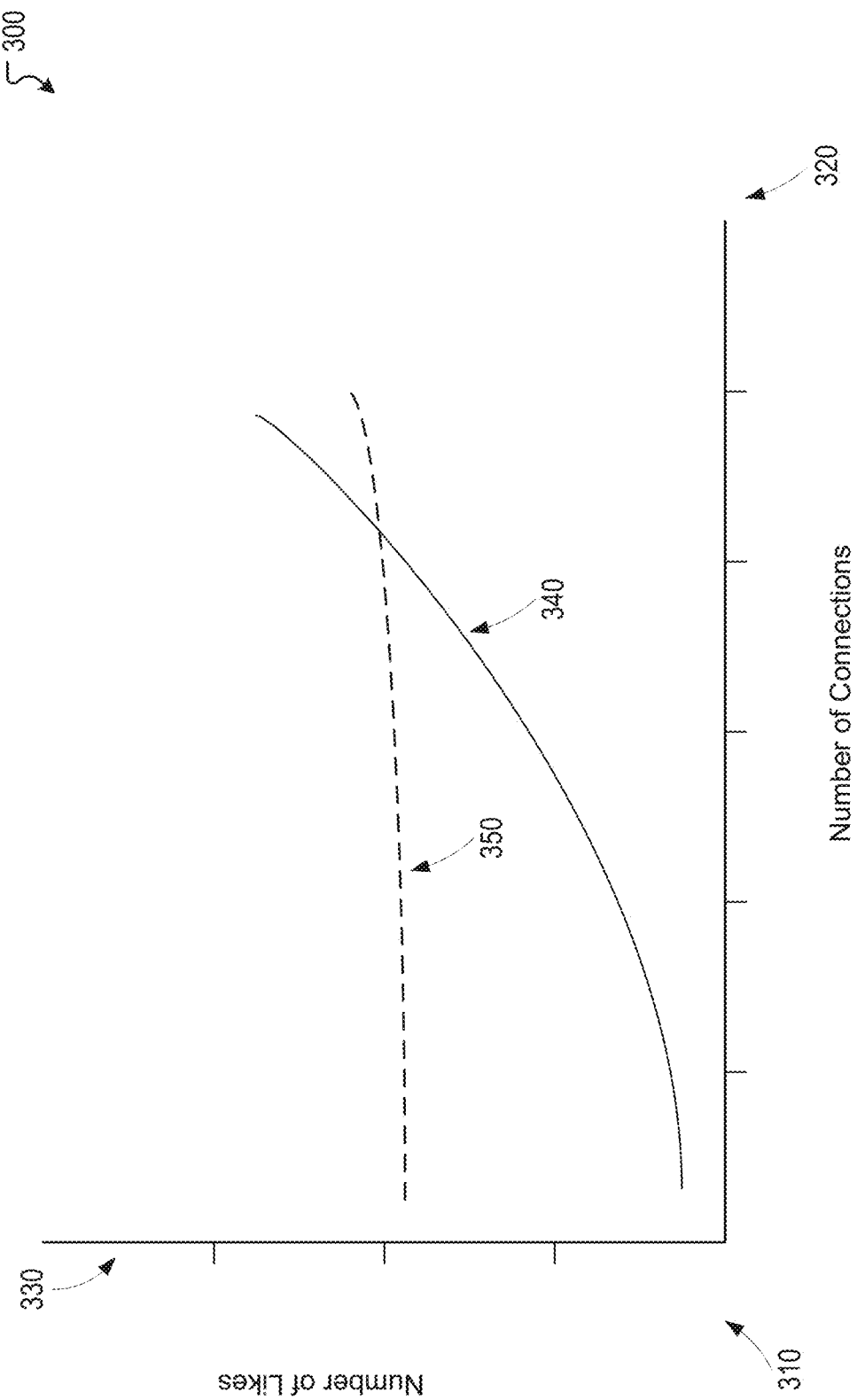
FIG. 3 illustrates an example scenario for providing a boost for small accounts in ranking content items for feeds, according to an embodiment of the present disclosure.

FIG. 3 illustrates an example scenario 300 for providing a boost for small accounts in ranking content items for feeds, according to an embodiment of the present disclosure. FIG. 3 illustrates a chart 310 showing a distribution of feedback 340 without applying a boosting parameter to small account content items and a distribution of feedback 350 after applying a boosting parameter to small account content items. In the example of FIG. 3, the type of feedback illustrated is a number of likes. In other examples, other types of feedback, such as comments, shares, etc., can be used. The x-axis 320 of the chart 310 represents a number of connections that an account has. The y-axis 330 of the chart 310 represents a number of likes associated with content items of an account. Without applying the boosting parameter, the number of likes distributed to accounts is shown by the distribution 340. As indicated by the distribution 340, most of the likes are distributed to top accounts (i.e., accounts having a relatively large number of connections). After applying the boosting parameter, the number of likes is distributed more evenly to accounts, as shown by the distribution 350. As reflected in the distribution 350, small accounts (i.e., accounts having a relatively small number of connections) receive a larger share of likes as compared to the distribution 340.

FIG. 4 illustrates an example first method 400 for providing a boost for small accounts in ranking content items for feeds, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can determine a value of a boosting parameter, wherein the boosting parameter is indicative of a value of feedback to a first account type. At block 404, the example method 400 can determine respective scores of a plurality of content items that are candidates for a feed of a user, wherein the plurality of content items are associated with at least one of the first account type or a second account type. At block 406, the example method 400 can adjust respective scores of content items associated with the first account type in the plurality of content items, based on the value of the boosting parameter. At block 408, the example method 400 can rank the plurality of content items based on the respective scores of the plurality of content items. Other suitable techniques that incorporate various features and embodiments of the present disclosure are possible.

Figure 5:
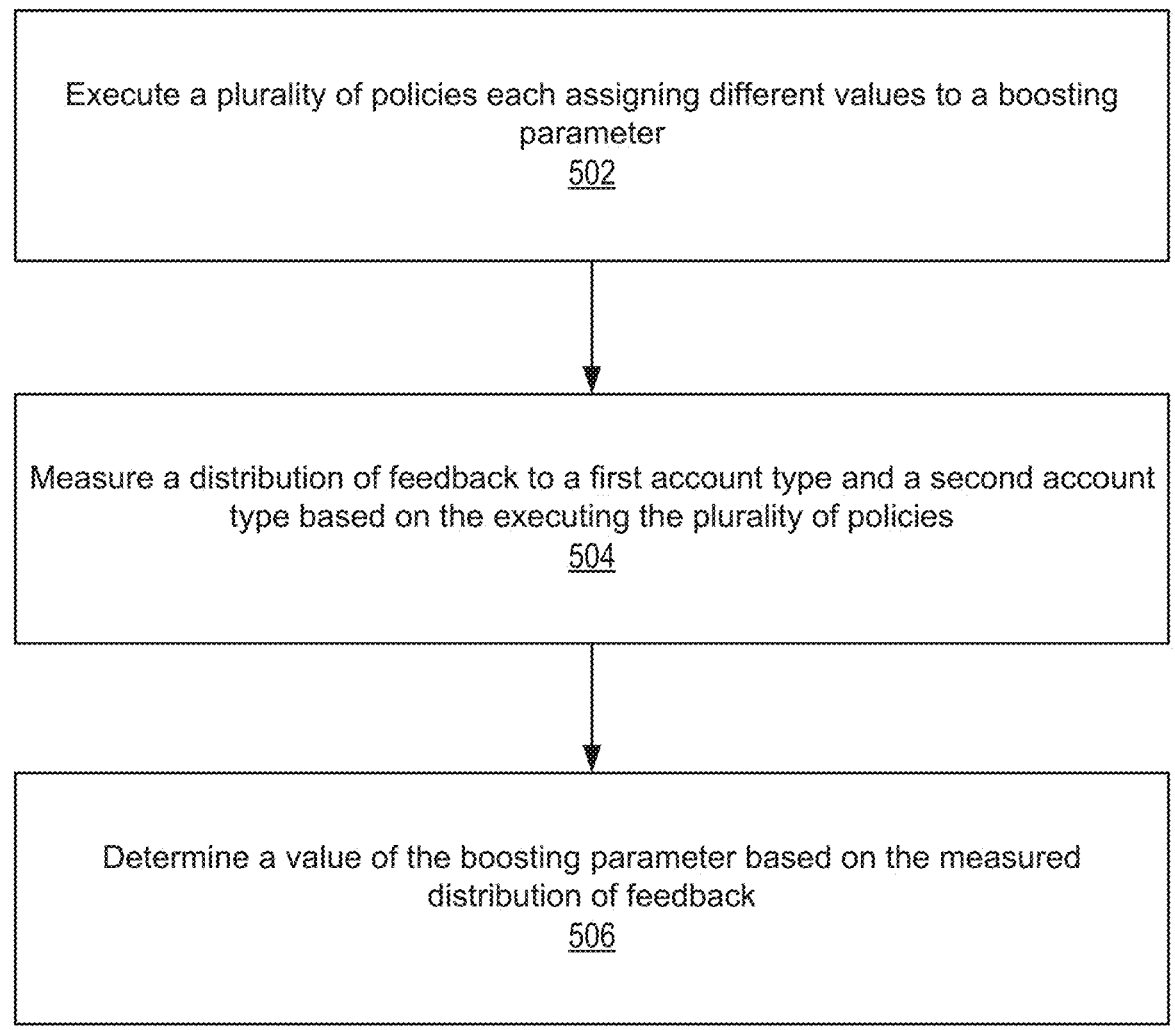
FIG. 5 illustrates an example second method for providing a boost for small accounts in ranking content items for feeds, according to an embodiment of the present disclosure.

FIG. 5 illustrates an example second method 500 for providing a boost for small accounts in ranking content items for feeds, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can execute a plurality of policies each assigning different values to a boosting parameter. The boosting parameter can be similar to the boosting parameter explained in connection with FIG. 4. At block 504, the example method 500 can measure a distribution of feedback to a first account type and a second account type based on the executing the plurality of policies. The first account type can be similar to the first account type explained in connection with FIG. 4. The second account type can be similar to the second account type explained in connection with FIG. 4. At block 506, the example method 500 can determine a value of the boosting parameter based on the measured distribution of feedback. The value of the boosting parameter can be similar to the value of the boosting parameter explained in connection with FIG. 4. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
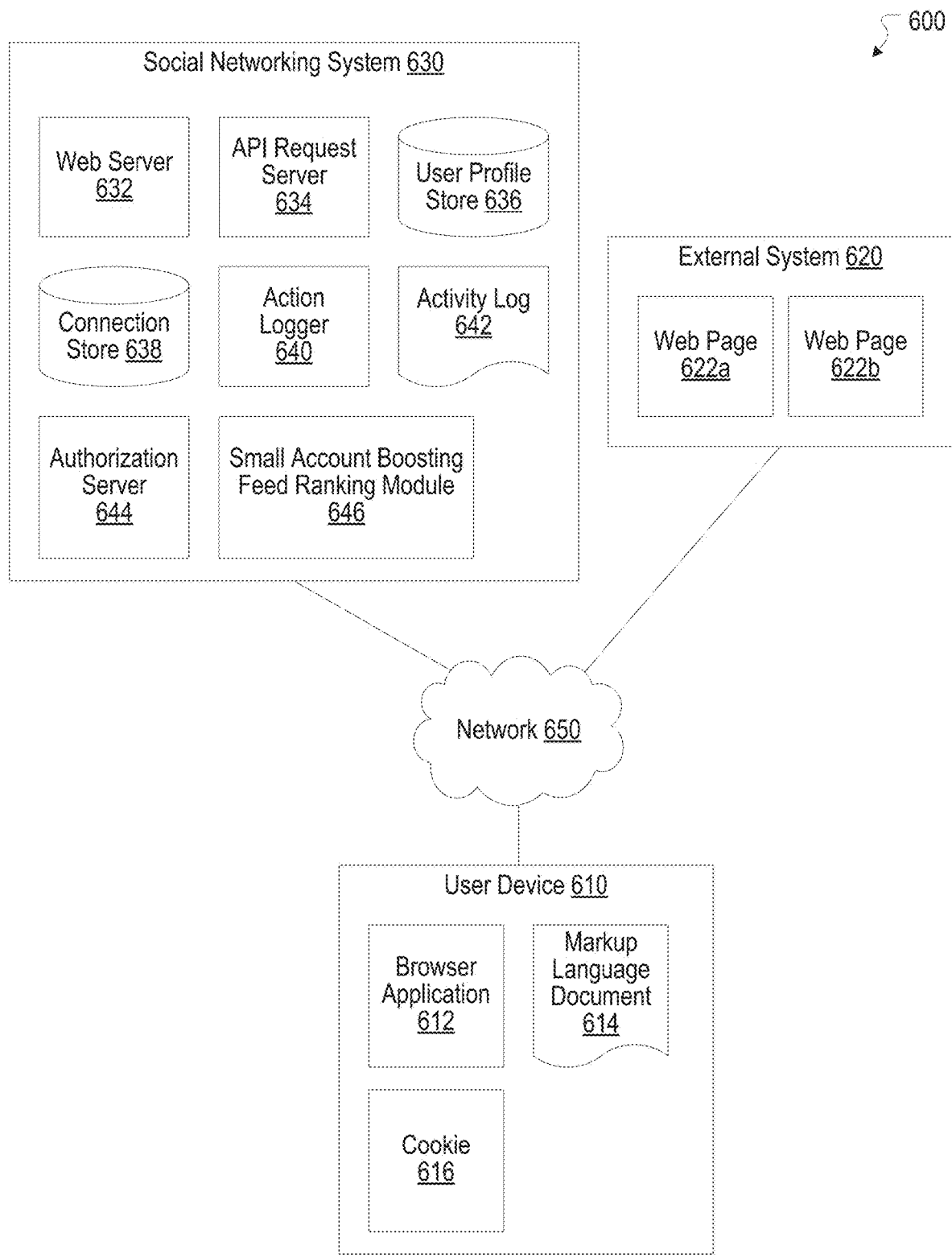
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an small account boosting feed ranking module 646. The small account boosting feed ranking module 646 can be implemented with the small account boosting feed ranking module 102, as discussed in more detail herein. In some embodiments, one or more functionalities of the small account boosting feed ranking module 646 can be implemented in the user device 610.

Hardware Implementation

Figure 7:
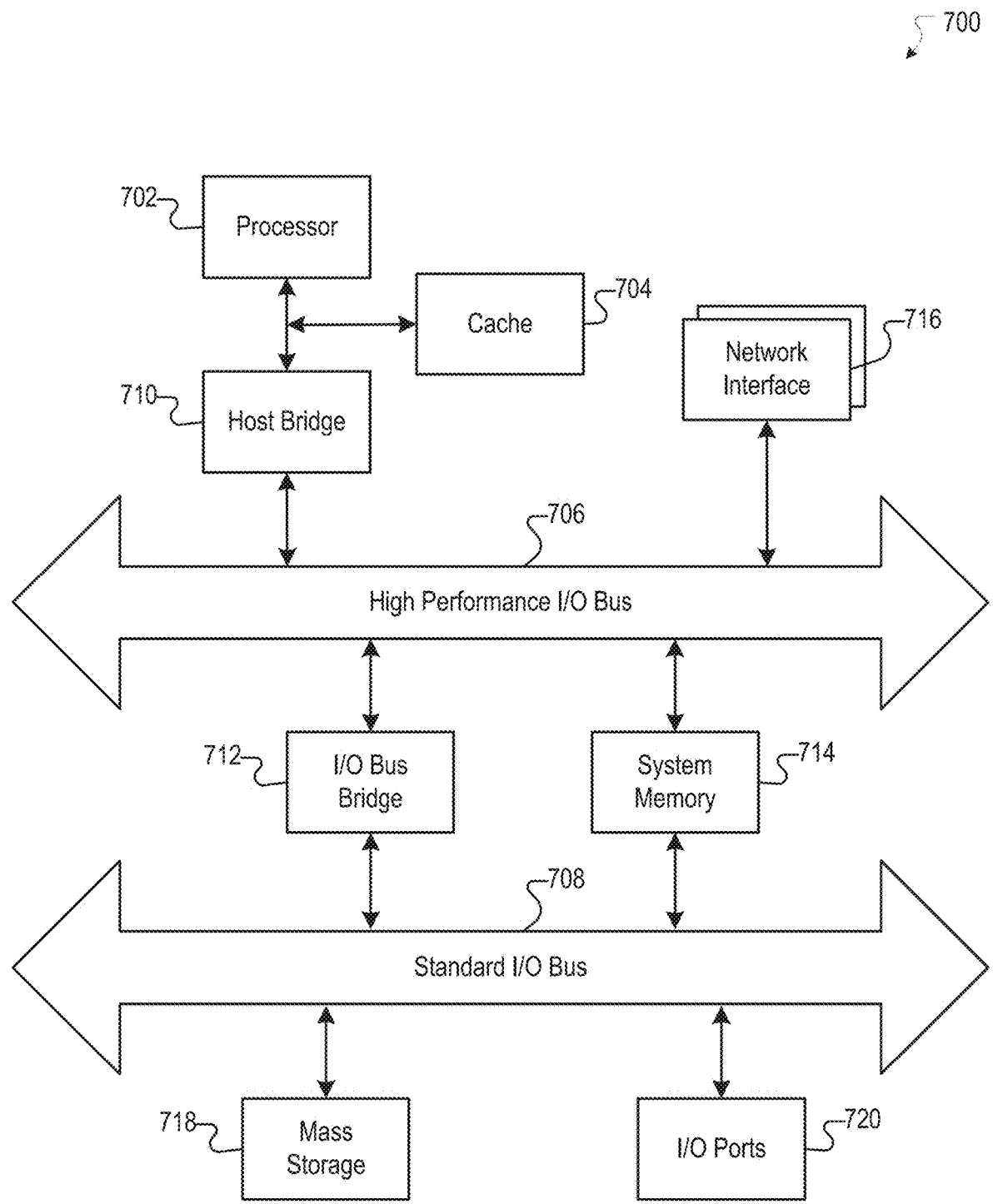
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining, by a computing system, a value of a boosting parameter based at least in part on a distribution of feedback to a first account type and a second account type, wherein the distribution of feedback is based at least in part on an execution of a plurality of policies that each assign a respective value to the boosting parameter, wherein the boosting parameter is indicative of a value of feedback to the first account type;
   determining, by the computing system, respective scores of a plurality of content items that are candidates for a feed of a user, wherein the plurality of content items is associated with at least one of: the first account type or the second account type;
   adjusting, by the computing system, respective scores of content items associated with the first account type in the plurality of content items, based on the value of the boosting parameter; and
   ranking, by the computing system, the plurality of content items based on the respective scores of the plurality of content items.

2. The computer-implemented method of claim 1, wherein the first account type is associated with a number of connections that is below a threshold value.

3. The computer-implemented method of claim 1, wherein the feedback is a like for a content item.

4. The computer-implemented method of claim 1, wherein the determining the value of the boosting parameter comprises:
   measuring the distribution of feedback to the first account type and the second account type; and
   determining the value of the boosting parameter based on the measured distribution of feedback.

5. The computer-implemented method of claim 4, wherein the boosting parameter is associated with a control variable of a proportional-integral-derivative (PID) controller, and the measuring the distribution of feedback comprises measuring a process variable of the PID controller.

6. The computer-implemented method of claim 5, wherein the determining the value of the boosting parameter based on the measured distribution of feedback comprises minimizing an error between a measured value of the process variable and a setpoint indicative of a desired value of the process variable.

7. The computer-implemented method of claim 5, wherein the process variable is a number of likes for content items associated with the first account type.

8. The computer-implemented method of claim 1, further comprising providing at least some of the ranked plurality of content items in the feed of the user.

9. The computer-implemented method of claim 1, wherein the first account type is divided into one or more groups, and the boosting parameter is determined for each of the one or more groups.

10. The computer-implemented method of claim 1, wherein the adjusted respective scores of the content items associated with the first account type is associated with an increase in feedback for content items associated with the first account type.

11. A system comprising:
    at least one hardware processor; and
    a memory storing instructions that, when executed by the at least one processor, cause the system to perform:
      determining a value of a boosting parameter based at least in part on a distribution of feedback to a first account type and a second account type, wherein the distribution of feedback is based at least in part on an execution of a plurality of policies that each assign a respective value to the boosting parameter, wherein the boosting parameter is indicative of a value of feedback to the first account type;
      determining respective scores of a plurality of content items that are candidates for a feed of a user, wherein the plurality of content items are associated with at least one of: the first account type or the second account type;
      adjusting respective scores of content items associated with the first account type in the plurality of content items, based on the value of the boosting parameter; and
      ranking the plurality of content items based on the respective scores of the plurality of content items.

12. The system of claim 11, wherein the first account type is associated with a number of connections that is below a threshold value.

13. The system of claim 11, wherein the determining the value of the boosting parameter comprises:
   measuring the distribution of feedback to the first account type and the second account type; and
   determining the value of the boosting parameter based on the measured distribution of feedback.

14. The system of claim 13, wherein the boosting parameter is associated with a control variable of a proportional-integral-derivative (PID) controller, and the measuring the distribution of feedback comprises measuring a process variable of the PID controller.

15. The system of claim 14, wherein the determining the value of the boosting parameter based on the measured distribution of feedback comprises minimizing an error between a measured value of the process variable and a setpoint indicative of a desired value of the process variable.

16. A non-transitory computer readable medium including instructions that, when executed by at least one hardware processor of a computing system, cause the computing system to perform a method comprising:
   determining a value of a boosting parameter based at least in part on a distribution of feedback to a first account type and a second account type, wherein the distribution of feedback is based at least in part on an execution of a plurality of policies that each assign a respective value to the boosting parameter, wherein the boosting parameter is indicative of a value of feedback to the first account type;
   determining respective scores of a plurality of content items that are candidates for a feed of a user, wherein the plurality of content items are associated with at least one of: the first account type or the second account type;
   adjusting respective scores of content items associated with the first account type in the plurality of content items, based on the value of the boosting parameter; and
   ranking the plurality of content items based on the respective scores of the plurality of content items.

17. The non-transitory computer readable medium of claim 16, wherein the first account type is associated with a number of connections that is below a threshold value.

18. The non-transitory computer readable medium of claim 16, wherein the determining the value of the boosting parameter comprises:
   measuring the distribution of feedback to the first account type and the second account type; and
   determining the value of the boosting parameter based on the measured distribution of feedback.

19. The non-transitory computer readable medium of claim 18, wherein the boosting parameter is associated with a control variable of a proportional-integral-derivative (PID) controller, and the measuring the distribution of feedback comprises measuring a process variable of the PID controller.

20. The non-transitory computer readable medium of claim 19, wherein the determining the value of the boosting parameter based on the measured distribution of feedback comprises minimizing an error between a measured value of the process variable and a setpoint indicative of a desired value of the process variable.

* * * * *